US012060103B2

(12) United States Patent
Choi

(10) Patent No.: US 12,060,103 B2
(45) Date of Patent: Aug. 13, 2024

(54) STEERING CONTROL SYSTEM AND METHOD

(71) Applicant: HYUNDAI MOBIS CO., LTD., Seoul (KR)

(72) Inventor: Moon Cheon Choi, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 17/886,513

(22) Filed: Aug. 12, 2022

(65) Prior Publication Data

US 2023/0134824 A1    May 4, 2023

(30) Foreign Application Priority Data

Nov. 1, 2021  (KR) .................. 10-2021-0148313

(51) Int. Cl.
*B62D 15/02*    (2006.01)
*G01S 19/13*    (2010.01)

(52) U.S. Cl.
CPC ............ *B62D 15/024* (2013.01); *G01S 19/13* (2013.01)

(58) Field of Classification Search
None
See application file for complete search history.

(56) References Cited

U.S. PATENT DOCUMENTS

| 8,170,739 B2 * | 5/2012 | Lee ........................ G01C 21/12 701/28 |
| 2020/0192383 A1 * | 6/2020 | Nath .................... G05D 1/0278 |
| 2023/0131835 A1 * | 4/2023 | Hwang ............... B60W 60/001 701/22 |

FOREIGN PATENT DOCUMENTS

KR    20150092886 A    8/2015

OTHER PUBLICATIONS

Wang et al., "The Improved Pure Pursuit Algorithm for Autonomous Driving Advanced System", 2017 IEEE 10th International Workshop on Computational Intelligence and Applications, Nov. 11-12, 2017, pp. 33-38 (Year: 2017).*
D. S. Lal, A. Vivek et al., "Lateral Control of an Autonomous Vehicle Based on Pure Pursuit Algorithm", 2017 IEEE International Conference on Technological Advancements in Power and Energy (TAP Energy), 2017, pp. 1-7 (Year: 2017).*

* cited by examiner

*Primary Examiner* — Tamara L Weber
(74) *Attorney, Agent, or Firm* — NovoTechIP International PLLC

(57) ABSTRACT

The present disclosure provides a steering control system including a steering angle calculating unit configured to calculate a required steering angle of a vehicle based on a heading angle difference which is a difference between a heading angle of the current vehicle and a heading angle of a traveling road at a target viewpoint, a current spacing distance which is a spacing distance in a vehicle width direction between the current vehicle and the traveling road, and a predicted spacing distance which is a spacing distance in the vehicle width direction between the vehicle and the traveling road at the target viewpoint.

14 Claims, 4 Drawing Sheets

$$r = a + \Delta y$$
$$a^2 + \Delta x^2 = r^2 \Bigg\} \; r = \frac{l^2}{2\Delta y}$$
$$\Delta x^2 + \Delta y^2 = l^2$$

$$\text{CURVATURE} = \frac{2\Delta y}{l^2}$$

STEERING CONTROL SYSTEM AND METHOD

CROSS-REFERENCE TO RELATED APPLICATIONS

The present application claims the benefit of priority to Korean Patent Application No. 10-2021-0148313, filed Nov. 1, 2021, the disclosure of which is incorporated herein by reference in its entirety.

TECHNICAL FIELD

The present disclosure relates to a steering control system and method, and more particularly, to a steering control system and method, in which a steering control system of a vehicle calculates a position of the vehicle and a target route and changes a target viewpoint of the vehicle depending on a surrounding environment, thereby allowing the vehicle to follow a given route determined on the basis of a required steering angle of the vehicle calculated on the basis of a heading angle of the vehicle and a spacing distance in a vehicle width direction between the vehicle and a traveling road.

BACKGROUND

Recently, studies have been conducted on technologies required for autonomous driving with the development of autonomous driving vehicles. Many studies have also been conducted on the technologies related to sensor development and the convergence of sensor data required for autonomous driving.

The studies on the technology required for autonomous driving can be broadly classified into the study on automobile location recognition using various sensors, GPS, and map data, and the study on the judgment of surrounding situations, the provision of vehicle paths, and the actuator control in the vehicle.

In addition, autonomous driving is being actively studied through artificial intelligence deep learning, but each of the studies on autonomous driving is being conducted by parts or integration.

In the related art, the vehicle needs to turn to travel along a route in which the vehicle is intended to travel. However, there is a problem in that a method of changing a setting value of a target viewpoint of the vehicle about which the vehicle turns from the route in which the vehicle currently travels to the route in which the vehicle is intended to travel is not specified.

Accordingly, recently, there is a need for a vehicle steering control method of estimating a position of a host vehicle and calculating a target route based on a map and changing a target viewpoint of the vehicle based on a surrounding environment, thereby allowing the vehicle to follow a given route.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide a steering control system and method, in which a steering control system of a vehicle calculates a position of the vehicle and a target route and changes a target viewpoint of the vehicle depending on a surrounding environment, thereby allowing the vehicle to follow a given route determined on the basis of a required steering angle of the vehicle calculated on the basis of a heading angle of the vehicle and a spacing distance in a vehicle width direction between the vehicle and a traveling road.

An aspect of the present disclosure provides a steering control system including: a steering angle calculating unit configured to calculate a required steering angle of a vehicle based on a heading angle difference which is a difference between a heading angle of the current vehicle and a heading angle of a traveling road at a target viewpoint, a current spacing distance which is a spacing distance in a vehicle width direction between the current vehicle and the traveling road, and a predicted spacing distance which is a spacing distance in the vehicle width direction between the vehicle and the traveling road at the target viewpoint, wherein a steering of the vehicle is controlled to follow a given route to be traveled based on results calculated by the steering angle calculating unit.

The steering angle calculating unit may determine a target viewpoint correction value based on a front viewpoint curvature of the vehicle and calculate the required steering angle of the vehicle by correcting the required steering angle of the vehicle in accordance with the correction value.

The front viewpoint curvature of the vehicle may be calculated on the basis of an x-axis front target viewpoint and a y-axis error value of the target viewpoint.

The heading angle difference may be calculated on the basis of a difference between a vehicle heading angle and a road heading angle of the target viewpoint based on a terrestrial coordinate.

The steering angle calculating unit may calculate the required steering angle of the vehicle by providing weighting factors to the current spacing distance and the predicted spacing distance.

A sum of the weighting factors respectively provided to the current spacing distance and the predicted spacing distance may be 1.

The steering angle calculating unit calculates the required steering angle of the vehicle through the flowing equation.

$$SW = K_3 \theta_e + K_4 \Delta y_{target} + (1-K_4) \Delta y_{zero}$$

(Here, SW represents the required steering angle, $K_3$ represents a heading angle difference gain, $\theta e$ represents the heading angle difference, $K_4$ represents a y-axis error gain at the target viewpoint, $\Delta y_{target}$ represents the spacing distance in the vehicle width direction between the vehicle and the traveling road at the target viewpoint, and $\Delta y_{zero}$ represents the spacing distance in the vehicle width direction between the current vehicle and the traveling road.)

The steering control system may further include a receiving unit configured to receive position information including position data of the traveling vehicle.

The receiving unit may receive the position information of the current vehicle through a GPS receiver.

The receiving unit may receive the position information of the current vehicle from longitude/latitude data and map data of the vehicle.

Another aspect of the present disclosure provides a steering control method including: receiving position information including position data of a traveling vehicle; and calculating a required steering angle of a vehicle based on a heading angle difference which is a difference between a heading angle of the current vehicle and a heading angle of a traveling road at a target viewpoint, a current spacing distance which is a spacing distance in a vehicle width direction between the current vehicle and the traveling road, and a predicted spacing distance which is a spacing distance in the vehicle width direction between the vehicle and the traveling road at the target viewpoint.

The steering control method may further include calculating a target viewpoint correction value based on a front viewpoint curvature of the vehicle after the receiving of the position information.

The front viewpoint curvature of the vehicle may be calculated on the basis of an x-axis front target viewpoint and a y-axis error value of the target viewpoint.

In the calculating of the required steering angle, the required steering angle may be calculated by providing weighting factors to the current spacing distance and the predicted spacing distance.

According to the steering control system and method according to the present disclosure, the steering control system of the vehicle calculates the position of the vehicle and the target route and changes the target viewpoint of the vehicle depending on the surrounding environment, thereby allowing the vehicle to follow the given route determined on the basis of the required steering angle of the vehicle calculated on the basis of the heading angle of the vehicle and the spacing distance in the vehicle width direction between the vehicle and the traveling road.

The effects obtained by the present disclosure are not limited to the aforementioned effects, and other effects, which are not mentioned above, will be clearly understood by those skilled in the art from the following description.

DETAILED DESCRIPTION

Figure 1:
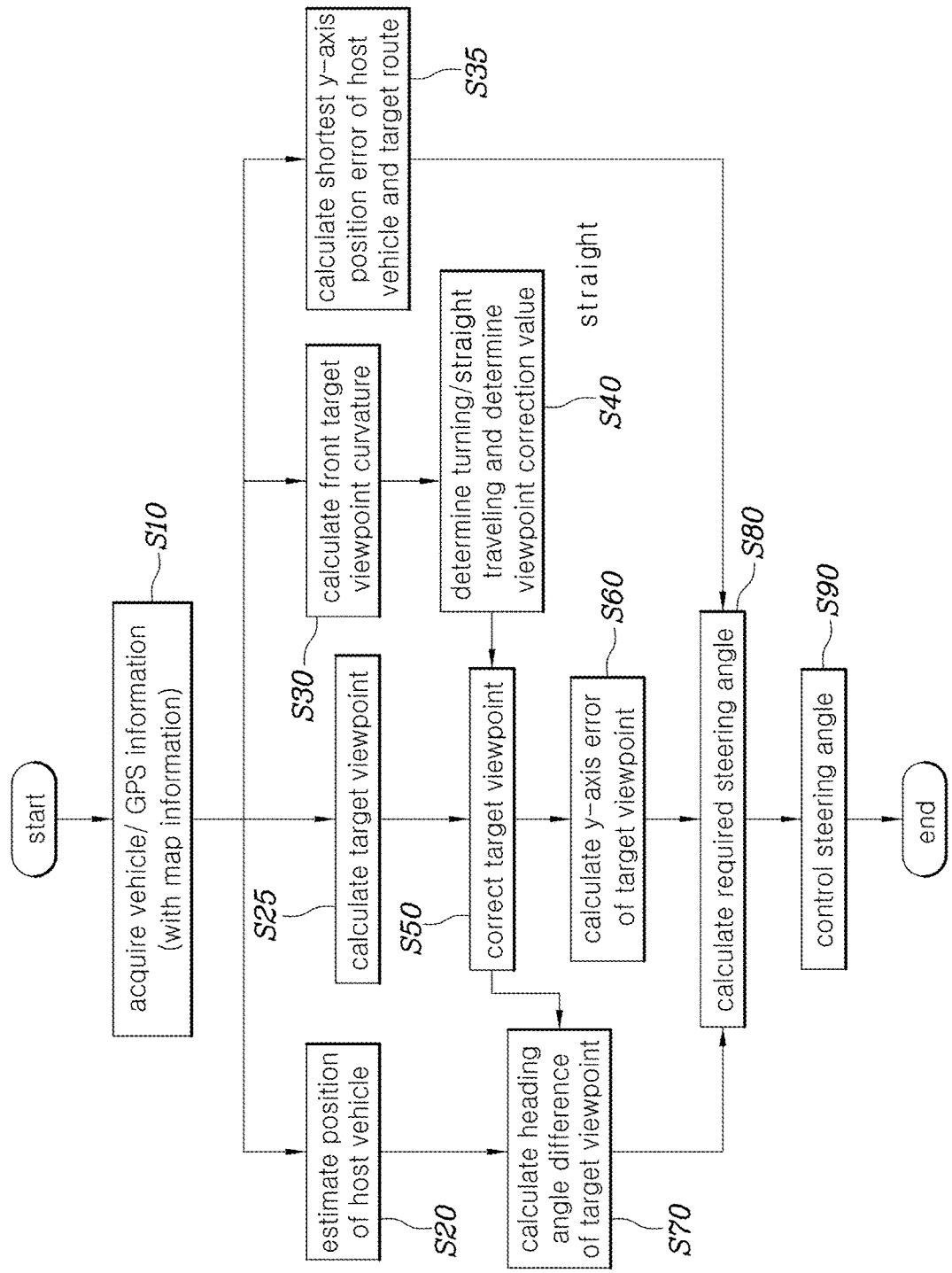
FIG. 1 is a flowchart illustrating a steering control method according to the present disclosure.

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

Unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present disclosure will be described in detail through description of preferred embodiments of the present disclosure with reference to the accompanying drawings. Like reference numerals indicated in the respective drawings refer to like members.

Figures 2, 3:
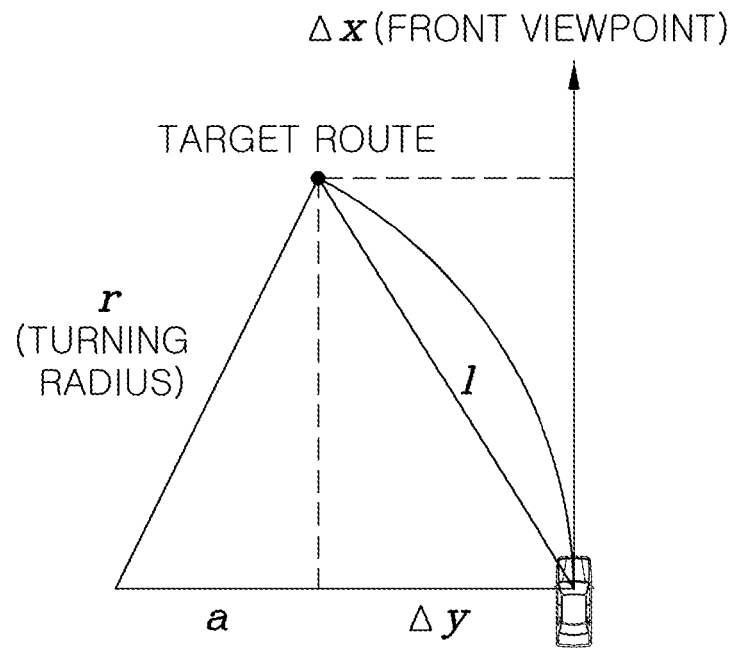
FIG. 2 is a schematic view illustrating a front viewpoint curvature of a vehicle with respect to the vehicle.
FIG. 3 is a calculation formula for the front viewpoint curvature of the vehicle illustrated in FIG. 2.
Figure 4:
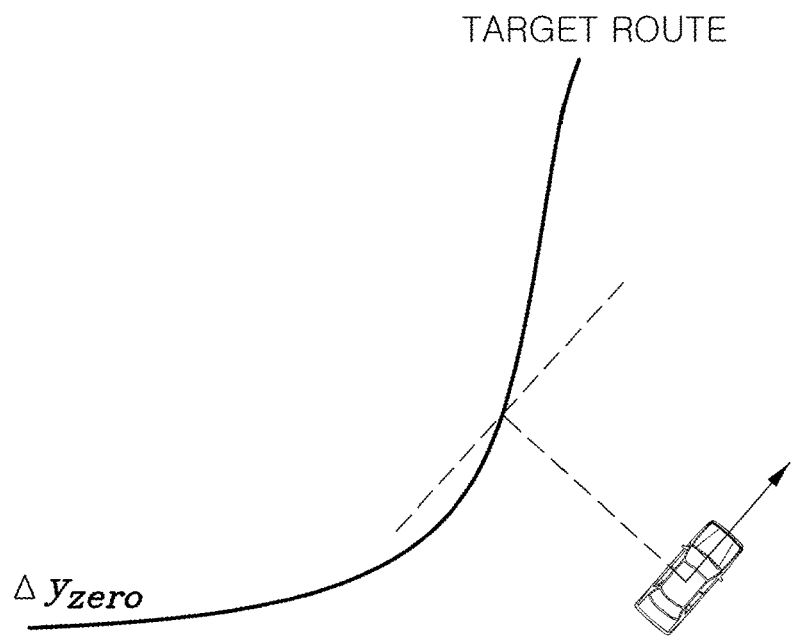
FIG. 4 is a schematic view illustrating a current spacing distance which is a spacing distance in a vehicle width direction between the current vehicle and a traveling road.
Figure 5:
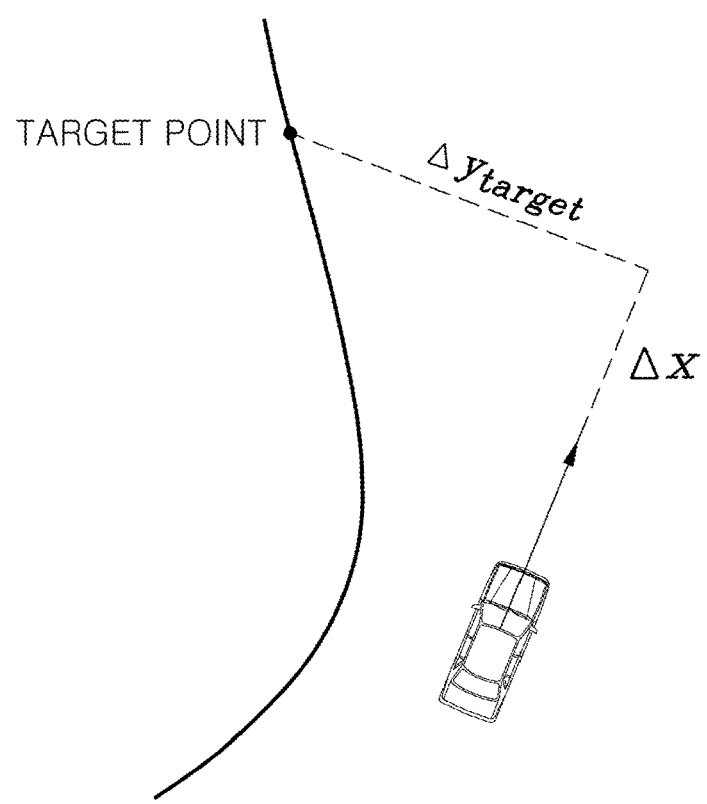
FIG. 5 is a schematic view illustrating a predicted spacing distance which is a spacing distance in the vehicle width direction between the vehicle and the traveling road at a target viewpoint.
Figure 6:
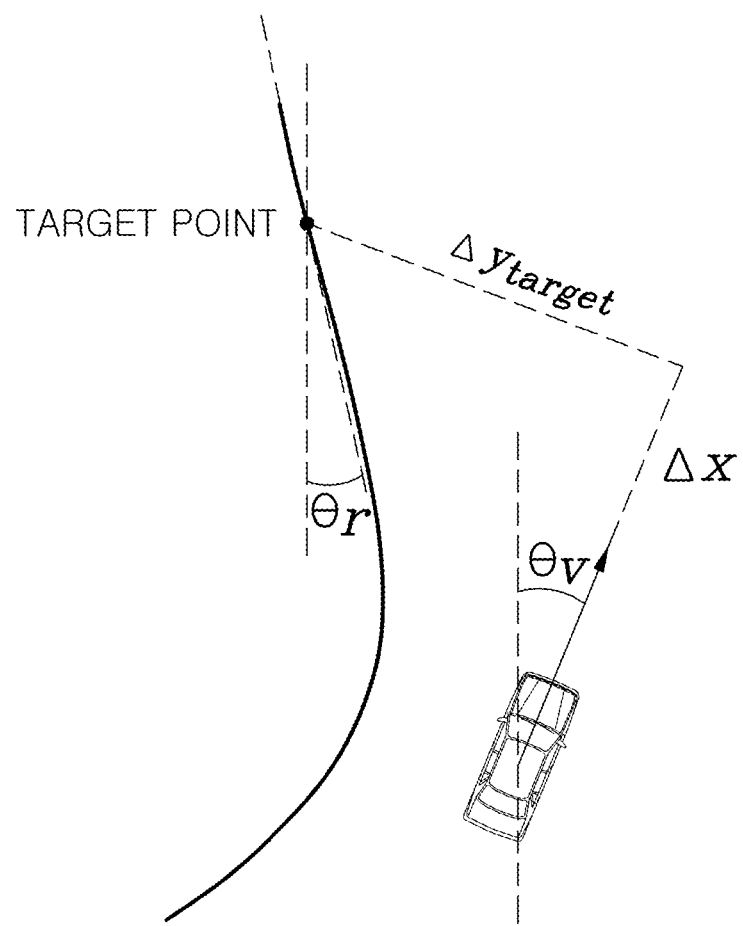
FIG. 6 is a schematic view illustrating a difference between a vehicle heading angle and a road heading angle at the target viewpoint based on a terrestrial coordinate.

FIG. 1 is a flowchart illustrating a steering control method according to the present disclosure. FIG. 2 is a schematic view illustrating a front viewpoint curvature of a vehicle with respect to the vehicle. FIG. 3 is a calculation formula for the front viewpoint curvature of the vehicle illustrated in FIG. 2. FIG. 4 is a schematic view illustrating a current spacing distance which is a spacing distance in a vehicle width direction (i.e., a current lateral distance) between the current vehicle and a traveling road. FIG. 5 is a schematic view illustrating a predicted spacing distance which is a spacing distance in the vehicle width direction (i.e., predicted lateral distance) between the vehicle and the traveling road at a target viewpoint. FIG. 6 is a schematic view illustrating a difference between a vehicle heading angle and a road heading angle at the target viewpoint based on a terrestrial coordinate.

The present disclosure provides a steering control system including a steering angle calculating unit configured to calculate a required steering angle of a vehicle based on a heading angle difference which is a difference between a heading angle of the current vehicle and a heading angle of a traveling road at a target viewpoint, a current spacing distance which is a spacing distance in a vehicle width direction between the current vehicle and the traveling road, and a predicted spacing distance which is a spacing distance in the vehicle width direction between the vehicle and the traveling road at the target viewpoint, wherein a steering of the vehicle is controlled to follow a given route to be traveled based on results calculated by the steering angle calculating unit.

According to the present disclosure, when a steering control system of the vehicle calculates a position of the vehicle and a target route and changes a target viewpoint of the vehicle in accordance with a surrounding environment, the steering control system allows the vehicle to follow a given route determined on the basis of a required steering angle of the vehicle calculated on the basis of the heading angle of the vehicle and the spacing distance in the vehicle width direction between the vehicle and the traveling road.

The vehicle needs to turn to travel along a route in which the vehicle is intended to travel. Therefore, the steering of the vehicle needs to be controlled by calculating the required steering angle of the vehicle based on the heading angle difference, the current spacing distance, and the predicted spacing distance in order to change a setting value of the target viewpoint of the vehicle about which the vehicle turns from the route in which the vehicle currently travels to the route in which the vehicle is intended to travel.

The steering control is performed by a device that allows a driver to adjust a traveling direction of the vehicle in accordance with his/her intention. In a case in which a vehicle equipped with an autonomous driving system turns, the steering angle needs to be changed to control the steering of the vehicle and move the vehicle to the route in which the vehicle is intended to travel.

In this case, the steering angle, which is required to control the steering and move the vehicle from the current position to a position of the route in which the vehicle is intended to travel, is inevitably calculated by using data based on information on the position at which the current vehicle is positioned.

Specifically, a receiving unit may receive the information on the position at which the vehicle is positioned and receive position information including position data of the traveling vehicle. The steering angle calculating unit may estimate the position of the vehicle or calculate the target viewpoint of the vehicle based on the position information including the position data of the traveling vehicle received by the receiving unit. Further, the steering angle calculating unit calculates a curvature of a front target viewpoint of the vehicle or calculates an error of a shortest y-axis position between the vehicle and the target route.

In this case, the target viewpoint of the vehicle means a position targeted by the vehicle on the traveling road on which the vehicle is intended to travel. The basic target viewpoint is determined depending on a vehicle speed. The basic target viewpoint is calculated by setting forward 0.5 seconds to the target viewpoint based on a current vehicle speed (m/s) of the vehicle. When forward 0.5 seconds is set to the basic target viewpoint, the calculation is made by a calculation formula below. Forward 0.5 seconds set to the basic target viewpoint may not always be limited to forward 0.5 seconds but changed depending on the target viewpoint.

$$vp = v_x[m/s] \times 0.5 \text{ [sec]}$$

In addition, the receiving unit may receive the position information of the current vehicle through a GPS receiver. The receiving unit is not limited to using only the GPS receiver. The receiving unit may use any means as long as the receiving unit may receive the position information including the position data of the traveling vehicle.

Further, the receiving unit may receive the position information of the current vehicle from longitude/latitude data and map data of the vehicle. The longitude/latitude data of the vehicle are converted into UTM and corrected by converting the longitude/latitude data obtained by the GPS receiver into coordinates. The steering angle calculating unit estimates the position of the vehicle by using the longitude/latitude data together with the map data obtained by a navigation system mounted in the vehicle.

FIG. 2 is a schematic view illustrating the front viewpoint curvature of a vehicle with respect to the vehicle.

Referring to FIG. 2, the steering angle calculating unit may determine a target viewpoint correction value based on the front viewpoint curvature of the vehicle and correct and calculate the required steering angle of the vehicle based on the correction value.

Specifically, the steering angle calculating unit calculates the basic target viewpoint by using the basic target viewpoint calculation formula and sets the target viewpoint to be larger than the calculated basic target viewpoint, thereby calculating a curvature of a road of the route in which the vehicle is intended to travel. The basic target viewpoint is determined as the front viewpoint of 0.5 seconds based on the current vehicle speed. However, in a curvature calculating step S70, any time, which is at least 0.5 seconds or longer, may be selected to determine a situation of the traveling route in which the vehicle is intended to travel.

Further, whether the vehicle turns or travels straight needs to be determined to determine the target viewpoint correction value. When the front viewpoint curvature of the vehicle is smaller than a value made by multiplying a correction value for each vehicle speed by a reference curvature, a route in this situation is determined as a straight route. When the front viewpoint curvature of the vehicle is larger than the value made by multiplying the correction value for each vehicle speed by the reference curvature, a route in this situation is determined as a turning route.

In this step S40, when a forward route is the straight route, there is no problem because a degree of influence of the length of the target viewpoint is low. However, when the forward route is the turning route, the target viewpoint needs to be corrected. The difference between the heading angle of the current vehicle and the road heading angle at the target viewpoint is used as an important factor for determining the steering angle. When the heading angle difference increases as the distance from the target viewpoint increases, the vehicle moves toward the inside of the target route. Therefore, when it is determined that the curvature at the front viewpoint is a predetermined value or more, this situation is determined as a situation in which the vehicle turns, and the correction value of the target viewpoint is set. In this case, the correction value is separately required because a degree of influence of the curvature varies depending on the vehicle speed.

In addition, when the forward route is determined as the turning route based on the front viewpoint curvature of the vehicle, the target viewpoint correction value is determined on the basis of the curvature value. As the target viewpoint correction value is limited to 0.5 to 1, a maximum target viewpoint correction value is limited to 1 even though a turning curvature is large. As a result, a final target viewpoint is calculated by multiplying the basic viewpoint by the target viewpoint correction value.

In addition, FIG. 3 is a calculation formula for the front viewpoint curvature of the vehicle illustrated in FIG. 2.

Referring to FIG. 3, the front viewpoint curvature of the vehicle is calculated on the basis of an x-axis front target viewpoint and a y-axis error value of the target viewpoint. As illustrated in FIG. 2, a distance from the target viewpoint is set on the basis of a point at which a line in the width direction of the vehicle meets a line extending perpendicularly to the target viewpoint. Further, the front viewpoint curvature of the vehicle may be calculated on the basis of a radius which is a turning radius.

In addition, the steering angle calculating unit may calculate the required steering angle of the vehicle based on the heading angle difference which is a difference between the heading angle of the current vehicle and the heading angle of the traveling road at the target viewpoint, the current spacing distance which is a spacing distance in the vehicle width direction between the current vehicle and the traveling road, and the predicted spacing distance which is a spacing distance in the vehicle width direction between the vehicle and the traveling road at the target viewpoint.

Specifically, FIG. 6 is a schematic view illustrating a difference between the vehicle heading angle and the road heading angle at the target viewpoint based on a terrestrial coordinate.

Referring to FIG. 6, the heading angle difference may be calculated on the basis of the difference between the vehicle heading angle and the road heading angle at the target viewpoint based on the terrestrial coordinate. The steering angle calculating unit uses the heading angle difference, together with the current spacing distance and the predicted spacing distance, to calculate the required steering angle of the vehicle.

In addition, FIG. 4 is a schematic view illustrating the current spacing distance which is a spacing distance in the vehicle width direction between the current vehicle and the traveling road. In addition, FIG. 5 is a schematic view illustrating the predicted spacing distance which is a spacing distance in the vehicle width direction between the vehicle and the traveling road at the target viewpoint.

Referring to FIGS. 4 and 5, the steering angle calculating unit may calculate the required steering angle of the vehicle by providing weighting factors to the current spacing distance and the predicted spacing distance. The required steering angle of the vehicle is used to allow the vehicle to follow the route to the final target viewpoint. The required steering angle at the target viewpoint is calculated by providing the weighting factor to the current spacing distance, which is a spacing distance in the width direction of the vehicle from the current vehicle position, and providing the weighting factor to the predicted spacing distance which is a spacing distance in the width direction of the vehicle from the traveling road. In this case, degrees of importance of the current spacing distance and the predicted spacing distance may be different from each other. In this case, a sum of the weighting factors respectively provided to the current spacing distance and the predicted spacing distance is set to 1. Therefore, when a large weighting factor is provided to the current spacing distance, the weighting factor to be provided to the predicted spacing distance is decreased. Further, when the weighting factor to be provided to the current spacing distance decreases, a large weighting factor is provided to the predicted spacing distance.

As a result, the steering angle calculating unit may calculate the required steering angle of the vehicle by using the following equation.

$$SW = K_3\theta_e + K_4\Delta y_{target} + (1-K_4)\Delta y_{zero}$$

Here, SW represents the required steering angle, $K_3$ represents a heading angle difference gain, $\theta_e$ represents the heading angle difference, $K_4$ represents a y-axis error gain at the target viewpoint, $\Delta y_{target}$ represents the spacing distance in the vehicle width direction between the vehicle and the traveling road at the target viewpoint, and $\Delta y_{zero}$ represents the spacing distance in the vehicle width direction between the current vehicle and the traveling road.)

Specifically, $K_3$ and $K_4$ are changed on the basis of the vehicle speed and the turning situation, and a range of $K_4$ is limited to 0 to 1. When it is determined that the vehicle turns, $K_4$ approximates 1, and the weighting factor of $\Delta y_{target}$ increases. when it is determined that the vehicle travels straight, $K_4$ approximates 0, and the weighting factor of $\Delta y_{zero}$ increases. Because the weighting factor of $\Delta y_{target}$ is small when the vehicle travels straight, a weighting factor is provided to the position error value of the current vehicle.

FIG. 1 is a flowchart illustrating a steering control method according to the present disclosure.

Referring to FIG. 1, the steering control method includes: a step S10 of receiving the position information including the position data of the traveling vehicle; and a step S80 of calculating the required steering angle of the vehicle based on the heading angle difference which is a difference between the heading angle of the current vehicle and the heading angle of the traveling road at the target viewpoint, the current spacing distance which is a spacing distance in the vehicle width direction between the current vehicle and the traveling road, and the predicted spacing distance which is a spacing distance in the vehicle width direction between the vehicle and the traveling road at the target viewpoint.

Because the detailed technical features in the respective steps of the steering control method according to the present disclosure are identical or similar to the respective technical features of the respective configurations of the steering control system according to the present disclosure described above, detailed descriptions thereof will be omitted.

In addition, the steering control method may further include a step S20 of estimating the position of the vehicle after the step S10 of receiving the position information.

In addition, the steering control method may further include a step S25 of calculating the target viewpoint after the step S10 of receiving the position information.

In addition, the steering control method may further include a step S30 of calculating the curvature of the front target viewpoint after the step S10 of receiving the position information.

In addition, the steering control method may further include a step S35 of calculating the shortest y-axis position error of the target route of the vehicle after the step S10 of receiving the position information.

In addition, the steering control method may further include a step S40 of calculating the target viewpoint correction value based on the front viewpoint curvature of the vehicle after the step S10 of receiving the position information.

In addition, the steering control method may further include a step S50 of correcting the target viewpoint based on the correction value after the step S40 of calculating the target viewpoint correction value.

In addition, the steering control method may further include a step S60 of calculating the y-axis error of the target viewpoint after the step S50 of correcting the target viewpoint.

In addition, the steering control method may further include a step S70 of calculating the heading angle difference of the target viewpoint after the step S50 of correcting the target viewpoint.

The front viewpoint curvature of the vehicle may be calculated on the basis of the x-axis front target viewpoint and the y-axis error value of the target viewpoint.

In the step S80 of calculating the required steering angle, the required steering angle is calculated by providing the weighting factors to the current spacing distance and the predicted spacing distance.

In addition, the steering control method may further include a step S90 of controlling the steering angle of the vehicle after the step S80 of calculating the required steering angle.

As a result, according to the steering control system and method according to the present disclosure, the steering control system of the vehicle calculates the position of the vehicle and the target route and changes the target viewpoint of the vehicle depending on the surrounding environment, thereby allowing the vehicle to follow the given route determined on the basis of the required steering angle of the vehicle calculated on the basis of the heading angle of the vehicle and the spacing distance in the vehicle width direction between the vehicle and the traveling road.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A steering control system comprising:
a steering angle calculating unit configured to calculate:
a required steering angle of a traveling vehicle based a difference between a current heading angle of the vehicle and an angle of travel of the vehicle at a target viewpoint on a road to be traveled;
a current lateral distance between the vehicle and the road to be traveled; and
a predicted lateral distance between the vehicle and the road to be traveled at the target viewpoint,
wherein a steering of the vehicle is controlled to follow a given route to be traveled based on results calculated by the steering angle calculating unit.

2. The steering control system of claim 1, wherein the steering angle calculating unit is configured to:
determine a target viewpoint correction value based on a forward viewpoint curvature of the vehicle; and
calculate the required steering angle of the vehicle by correcting the required steering angle of the vehicle in accordance with the correction value.

3. The steering control system of claim 2, wherein the forward viewpoint curvature of the vehicle is calculated based on an x-axis front target viewpoint and a y-axis error value of the target viewpoint.

4. The steering control system of claim 1, wherein the heading angle difference is calculated based on a difference between a current vehicle heading angle and a road heading angle of the target viewpoint based on a terrestrial coordinate.

5. The steering control system of claim 1, wherein the steering angle calculating unit is configured to calculate the required steering angle of the vehicle by providing weighting factors to the current and predicted lateral distances.

6. The steering control system of claim 5, wherein a sum of the weighting factors respectively provided to the current and predicted lateral distances is 1.

7. The steering control system of claim 1, wherein the steering angle calculating unit is configured to calculate the required steering angle of the vehicle using the flowing equation:

$$SW = K_3 \theta_e + K_4 \Delta y_{target} + (1 - K_4) \Delta y_{zero},$$

wherein, SW represents the required steering angle, $K_3$ represents heading angle difference gain, $\theta e$ represents heading angle difference, $K_4$ represents y-axis error gain at the target viewpoint, $\Delta y_{target}$ represents lateral distance between the vehicle and the road to be traveled at the target viewpoint, and $\Delta y_{zero}$ represents lateral distance between the vehicle and the road to be traveled.

8. The steering control system of claim 1, further comprising:
a receiving unit configured to receive position information including vehicle position data.

9. The steering control system of claim 8, wherein the receiving unit receives the vehicle position information through a GPS receiver.

10. The steering control system of claim 8, wherein the receiving unit receives the vehicle position information from longitude/latitude data and map data of the vehicle.

11. A steering control method comprising:
receiving position information including position data of a traveling vehicle; and
calculating a required steering angle of the vehicle based on a difference between a current heading angle of the vehicle and a heading angle of a road to be traveled at a target viewpoint, a current lateral distance between the vehicle and the road to be traveled, and a predicted lateral distance between the vehicle and the road to be traveled at the target viewpoint.

12. The steering control method of claim 11, further comprising:
calculating a target viewpoint correction value based on a front viewpoint curvature of the vehicle after receiving the position information.

13. The steering control method of claim 12, wherein the front viewpoint curvature of the vehicle is calculated based on an x-axis front target viewpoint and a y-axis error value of the target viewpoint.

14. The steering control method of claim 11, wherein calculating the required steering angle includes providing weighting factors to the current and predicted lateral distances.

* * * * *